United States Patent
Gong et al.

(10) Patent No.: US 10,574,280 B2
(45) Date of Patent: Feb. 25, 2020

(54) PASSIVE INTERMODULATION SUPPRESSION METHOD AND PASSIVE INTERMODULATION SUPPRESSION SYSTEM

(71) Applicant: Huawei Technologies Co., Ltd., Shenzhen (CN)

(72) Inventors: Lanping Gong, Shenzhen (CN); Lianghong Xiang, Shenzhen (CN); Weihong Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/454,225

(22) Filed: Jun. 27, 2019

(65) Prior Publication Data

US 2019/0319656 A1    Oct. 17, 2019

Related U.S. Application Data

(63) Continuation of application No. PCT/CN2017/118533, filed on Dec. 26, 2017.

(30) Foreign Application Priority Data

Dec. 29, 2016    (CN) .......................... 2016 1 1247608

(51) Int. Cl.
*H04B 1/12*    (2006.01)
*H04B 1/10*    (2006.01)
(Continued)

(52) U.S. Cl.
CPC ............. *H04B 1/12* (2013.01); *H04B 1/1027* (2013.01); *H04B 17/318* (2015.01); *H04W 88/08* (2013.01)

(58) Field of Classification Search
None
See application file for complete search history.

(56) References Cited

U.S. PATENT DOCUMENTS 5,697,081 A * 12/1997 Lyall, Jr. .............. H03G 3/3052
                                                    330/149
5,758,271 A *  5/1998 Rich ..................... H04W 52/18
                                                    455/234.1
(Continued)

FOREIGN PATENT DOCUMENTS

CN    103368588 A    10/2013
CN    103517299 A     1/2014
(Continued)

OTHER PUBLICATIONS

Jiang Jiang-Hu et al, "Study of passive intermodulation interference on Mobile communications antennas," Journal of Shaanxi University of Technology (Natural Science Edition), Vo. I, 27, No. 2, Jun. 2011, 5 pages.

*Primary Examiner* — Lana N Le
(74) *Attorney, Agent, or Firm* — Slater Matsil, LLP

(57) ABSTRACT

Embodiments of the present application disclose a passive intermodulation suppression method and a passive intermodulation suppression system. The method in the embodiments of the present application includes: obtaining, by using a target uplink controllable gain module, a first power Pt of an uplink signal sent by an antenna; obtaining a second power Pb of a signal that is output from an output port of a base station; configuring a target attenuation of the base station; and adjusting the initial gain value based on the target attenuation to keep a gain of the base station constant. According to the method described in the embodiments, the base station can maintain the target attenuation constant in a process of adjusting a gain of the target uplink controllable
(Continued)

gain module, thereby reducing a PIM requirement of a passive intermodulation suppression system.

13 Claims, 12 Drawing Sheets

(51) Int. Cl.
   *H04B 17/318* (2015.01)
   *H04W 88/08* (2009.01)

(56) References Cited

U.S. PATENT DOCUMENTS

| | | | | |
|---|---|---|---|---|
| 5,926,747 | A * | 7/1999 | Komara | H04W 52/146 |
| | | | | 370/320 |
| 6,032,031 | A * | 2/2000 | Takaki | H04B 1/109 |
| | | | | 455/245.2 |
| 6,230,031 | B1 * | 5/2001 | Barber | H01Q 1/242 |
| | | | | 455/127.3 |
| 6,236,863 | B1 * | 5/2001 | Waldroup | H03F 1/30 |
| | | | | 455/126 |
| 6,484,017 | B1 * | 11/2002 | Kim | H04B 1/04 |
| | | | | 330/280 |
| 7,127,211 | B2 * | 10/2006 | Hildebrand | H04B 1/525 |
| | | | | 455/63.1 |
| 7,197,289 | B2 * | 3/2007 | Zeira | H04W 52/52 |
| | | | | 375/345 |
| 2003/0100351 | A1 | 5/2003 | Friesen et al. | |
| 2012/0281772 | A1 * | 11/2012 | Bailey | H03F 1/3247 |
| | | | | 375/259 |
| 2013/0027110 | A1 * | 1/2013 | Beale | G06G 7/164 |
| | | | | 327/356 |
| 2016/0261297 | A1 | 9/2016 | Heinikoski et al. | |
| 2017/0126339 | A1 * | 5/2017 | Skarby | H04B 17/345 |

FOREIGN PATENT DOCUMENTS

| | | |
|---|---|---|
| CN | 104486282 A | 4/2015 |
| CN | 104967494 A | 10/2015 |
| CN | 104993880 A | 10/2015 |
| CN | 103986482 B | 2/2016 |
| CN | 106849970 A | 6/2017 |
| EP | 2178336 A1 | 4/2010 |
| JP | 2009027329 A * | 2/2009 |
| JP | 2009027329 A | 2/2009 |
| WO | 2014085345 A1 | 6/2014 |
| WO | 2016148538 A1 | 9/2016 |

* cited by examiner

PASSIVE INTERMODULATION SUPPRESSION METHOD AND PASSIVE INTERMODULATION SUPPRESSION SYSTEM

CROSS-REFERENCE TO RELATED APPLICATIONS

This application is a continuation of International Application No. PCT/CN2017/118533, filed on Dec. 26, 2017, which claims priority to Chinese Patent Application No. 201611247608.X, filed on Dec. 29, 2016. The aforementioned applications are hereby incorporated by reference in their entireties.

TECHNICAL FIELD

The present application relates to the field of communications technologies, and in particular, to a passive intermodulation suppression method and a passive intermodulation suppression system.

BACKGROUND

With constant evolution of wireless communications technologies such as 2G, 3G, and 4G, exponentially increasing requirements of people for data services (especially after intelligent terminals emerge on the market), a rapid increase in a quantity of mobile users, and an increasingly large quantity of high buildings, requirements for traffic density and coverage are continuously increasing. A single antenna needs to bear more frequency bands, and more frequency bands and carriers need to be transmitted on a feeder.

However, as frequency bands and carriers increase, a problem of passive intermodulation becomes more prominent. When radio frequency signal powers at two or more frequencies simultaneously occur on a passive radio frequency device, a passive intermodulation PIM product is generated. Such a product is a hybrid signal generated because of a nonlinearity characteristic of a heterogeneous material connection. Typically, a third-order product of passive intermodulation may exactly fall within an uplink frequency band or a receive frequency band of a base station; and the third-order product causes interference to a receiver, and in a serious case, may even make the receiver unable to work normally.

A specific interference case may be shown in FIG. 1. A horizontal coordinate in FIG. 1 represents a quantity of frequency bands supported by a single feeder, and a vertical coordinate in FIG. 1 represents a case of third-order hit reception. It can be learned from FIG. 1 that an increase in the quantity of frequency bands supported by the single feeder results in an exponential increase of cases of third-order hit reception.

In the prior art, the PIM problem is resolved mainly by eliminating occurrence of a frequency band combination that causes the PIM problem. For example, for input signals at 900 M, 1800 M, 2100 M, and 2600 M, because there are second-order, third-order, fourth-order, and fifth-order intermodulation products, an existing solution is that no feeders are shared between the low frequency 900 M and the high frequencies 180000 M, 2100 M, and 2600 M. In a feeder-limited scenario, a remote radio unit RRU needs to be mounted on a tower and/or a feeder needs to be added, to ensure that no feeders are shared between the low frequency goo M and the high frequencies 1800 M, 2100 M, and 2600 M.

However, in the prior-art solution, station design is complicated, and even a tower needs to be reinforced or a feeder needs to be added. Consequently, a frequency band auctioned by an operator is unusable on some tower stations, and high costs of tower reinforcement or feeder addition are caused.

SUMMARY

Embodiments of the present application provide a passive intermodulation suppression method and a passive intermodulation suppression system, to implement passive intermodulation suppression without mounting a remote radio unit RRU on a tower or adding a feeder.

A first aspect of the embodiments of the present application provides a passive intermodulation suppression method, including the following steps.

Step A: Obtain a first power Pt of an uplink signal sent by an antenna.

Specifically, in this embodiment, a target uplink controllable gain module obtains the first power Pt of the uplink signal sent by the antenna.

More specifically, at least one uplink controllable gain module is disposed between a base station and the antenna, and the target uplink controllable gain module is any one of the at least one uplink controllable gain module.

The target uplink controllable gain module is connected to the antenna by using a first jumper, the target uplink controllable gain module is connected to a feeder by using a second jumper, and the base station is connected to the feeder by using a third jumper.

The target controllable gain module is configured to send, to the base station, the uplink signal coupled from a port of the antenna.

The target controllable gain module may send the uplink signal to the base station according to a communication protocol AISG. It should be noted that the communication protocol used for sending the uplink signal to the base station by the target controllable gain module is not limited in this embodiment.

Step B: Obtain a second power Pb of a signal that is output from an output port of a base station.

Optionally, the target uplink controllable gain module described in this embodiment may send the first power Pt to the base station according to the communication protocol AISG.

Descriptions of the communication protocol AISG in this embodiment are an optional example, and impose no limitation. For example, the target uplink controllable gain module described in this embodiment may send the first power Pt to the base station according to a customized protocol.

Step C: Configure a target attenuation of the base station.

Specifically, the target attenuation $IL=G_0-(Pb-Pt)$, where $G_0$ is an initial gain value of the target uplink controllable gain module.

Step D: Adjust the initial gain value.

Specifically, the initial gain value is adjusted based on the target attenuation to keep a gain of the base station constant.

According to the method described in this embodiment, in a process of adjusting the gain of the target uplink controllable gain module, the base station can maintain the target attenuation constant, reduce a PIM requirement of a passive intermodulation suppression system, and improve sensitivity of uplink reception of the base station. In addition, according to the method described in this embodiment, a plurality of signals at a same frequency band or different frequency bands can share a feeder, and a remote radio unit RRU does not need to be mounted on a tower. It can be learned that according to the method described in this embodiment, no high costs of tower reinforcement or feeder addition are caused. In addition, the method described in this embodiment can be applicable to frequency bands of various signals, to avoid a case in which a frequency band auctioned by an operator is unusable on some tower stations.

With reference to the first aspect of the embodiments of the present application, in a first implementation of the first aspect of the embodiments of the present application, after step C, the method further includes the following steps.

Step C11: Obtain a first received total wideband power RTWP of an uplink of the base station.

Specifically, if the base station is currently in a downlink no-load state, the first received total wideband power RTWP of the uplink of the base station is obtained.

Step C12: Obtain a second RTWP of the uplink of the base station.

Specifically, the second RTWP is an RTWP that is used when target load is loaded onto a downlink of the base station, and the target load is less than or equal to a preset threshold.

According to the method described in this embodiment, adjustment may be performed based on the first RTWP and the second RTWP, to improve accuracy and efficiency of gain adjustment performed on the target uplink controllable gain module.

With reference to the first implementation of the first aspect of the embodiments of the present application, in a second implementation of the first aspect of the embodiments of the present application, step D includes the following steps.

Step D11: Generate first instruction information.

Specifically, if the first RTWP is less than the second RTWP, the first instruction information is generated. The first instruction information is used to instruct the target uplink controllable gain module to increase the initial gain value $G_0$ by step measured in target preset amounts.

Step D12: Send the first instruction information to the target uplink controllable gain module.

With reference to the second implementation of the first aspect of the embodiments of the present application, in a third implementation of the first aspect of the embodiments of the present application, after step D12, the method further includes the following step:

Step D13: Control the base station to attenuate a gain of the base station by step measured in the target preset amounts, to keep the gain of the base station constant.

According to the method described in this embodiment, the target uplink controllable gain module increases, by step, the initial gain value $G_0$ stored in the target uplink controllable gain module. To ensure that the target attenuation is constant, the base station attenuates the gain of uplink receive channel of the base station by step measured in the target preset amounts.

It should be noted that in this embodiment, that the target uplink controllable gain module increases the initial gain value $G_0$ by step and the base station attenuates the gain of the uplink receive channel of the base station by step are optional examples and impose no limitation, provided that a gain by which the initial gain value $G_0$ is increased by the target uplink controllable gain module is equal to an attenuation by which the gain of the uplink receive channel of the base station is attenuated. In other words, a gain change of the target uplink controllable gain module is equal to a gain change of the base station.

With reference to the second implementation of the first aspect of the embodiments of the present application or the third implementation of the first aspect of the embodiments of the present application, in a fourth implementation of the first aspect of the embodiments of the present application, after step D, the method further includes the following steps.

Step D21: Determine whether an absolute value of a difference between the first RTWP and the second RTWP is less than or equal to a preset value, and if yes, correspondingly perform step D22.

Step D22: Generate second instruction information.

Specifically, if it is determined that the absolute value of the difference between the first RTWP and the second RTWP is less than or equal to the preset value, the second instruction information is generated.

More specifically, the second instruction information is used to instruct the target uplink controllable gain module no longer to adjust a gain value.

Step D23: Send the second instruction information to the target uplink controllable gain module.

Specifically, in this embodiment, the target uplink controllable gain module increases the initial gain value $G_0$ by step measured in the target preset amounts until the base station performs step D21 to determine that the absolute value of the difference between the first RTWP and the second RTWP is less than or equal to the preset value. Then, the base station instructs, by using the second instruction information, the target uplink controllable gain module no longer to adjust the gain value, where the gain value in this step is a gain value obtained by adjusting the initial gain value $G_0$ by step by the target uplink controllable gain module. This maintains the target attenuation constant, reduces the PIM requirement of the passive intermodulation suppression system, and improves the sensitivity of uplink reception of the base station.

With reference to any one of the second implementation of the first aspect of the embodiments of the present application to the fourth implementation of the first aspect of the embodiments of the present application, in a fifth implementation of the first aspect of the embodiments of the present application, after step D, the method further includes the following steps.

Step D31: Obtain a current gain value $G_T$ of the target uplink controllable gain module.

Step D32: Determine whether the current gain value $G_T$ is equal to a preset maximum gain value, and if yes, perform step D33.

Step D33: Generate third instruction information.

Specifically, if determining that the current gain value $G_T$ is equal to the preset maximum gain value, the third instruction information is generated.

More specifically, the third instruction information is used to instruct the target uplink controllable gain module no longer to adjust the current gain value $G_T$.

Step D34: Send the third instruction information to the target uplink controllable gain module.

Specifically, in this embodiment, the target uplink controllable gain module increases the initial gain value $G_0$ by step measured in the target preset amounts until the base station performs step D32 to determine that the current gain value $G_T$ is equal to the preset maximum gain value. Then, the base station instructs, by using the third instruction information, the target uplink controllable gain module no longer to adjust a gain value, where the gain value in this step is a gain value obtained by adjusting the initial gain value $G_0$ by step by the target uplink controllable gain module. This maintains the target attenuation constant, reduces the PIM requirement of the passive intermodulation suppression system, and improves the sensitivity of uplink reception of the base station.

With reference to the first implementation of the first aspect of the embodiments of the present application, in a sixth implementation of the first aspect of the embodiments of the present application, step D includes the following steps.

Step D41: Generate fourth instruction information.

Specifically, if the first RTWP is equal to the second RTWP, the fourth instruction information is generated.

More specifically, the fourth instruction information is used to instruct the target uplink controllable gain module not to adjust the initial gain value $G_0$.

Step D42: Send the fourth instruction information to the target uplink controllable gain module.

Specifically, in this embodiment, the target uplink controllable gain module increases the initial gain value $G_0$ by step measured in the target preset amounts until the base station performs step D41 to determine that the first RTWP is equal to the second RTWP. Then, the base station instructs, by using the third instruction information, the target uplink controllable gain module no longer to adjust a gain value, where the gain value in this step is a gain value obtained by adjusting the initial gain value $G_0$ by step by the target uplink controllable gain module. This maintains the target attenuation constant, reduces the PIM requirement of the passive intermodulation suppression system, and improves the sensitivity of uplink reception of the base station.

A second aspect of the embodiments of the present application provides a passive intermodulation suppression system, including a base station and an antenna. At least one uplink controllable gain module is disposed between the base station and the antenna. The antenna is connected to a target uplink controllable gain module. The target uplink controllable gain module is any one of the at least one uplink controllable gain module, and the target uplink controllable gain module is further connected to the base station.

The base station is configured to perform the passive intermodulation suppression method according to any one of the first aspect of the embodiments of the present application to the sixth implementation of the first aspect of the embodiments of the present application.

For a specific process of performing the passive intermodulation suppression method, refer to the descriptions of any one of the first aspect of the embodiments of the present application to the sixth implementation of the first aspect of the embodiments of the present application. Details are not described in this embodiment again.

In the passive intermodulation suppression system described in this embodiment, in a process of adjusting a gain of the target uplink controllable gain module, the base station can maintain a target attenuation constant, reduce a PIM requirement of the passive intermodulation suppression system, and improve sensitivity of uplink reception of the base station. In addition, according to the method described in this embodiment, a plurality of signals at a same frequency band or different frequency bands can share a feeder, and a remote radio unit RRU does not need to be mounted on a tower. It can be learned that according to the method described in this embodiment, no high costs of tower reinforcement or feeder addition are caused. In addition, the method described in this embodiment can be applicable to frequency bands of various signals, to avoid a case in which a frequency band auctioned by an operator is unusable on some tower stations.

With reference to the second aspect of the embodiments of the present application, in a first implementation of the second aspect of the embodiments of the present application, the system further includes a first jumper, a second jumper, a third jumper, and a feeder.

The target uplink controllable gain module is connected to the antenna by using the first jumper, the target uplink controllable gain module is connected to the feeder by using the second jumper, and the base station is connected to the feeder by using the third jumper.

With reference to the second aspect of the embodiments of the present application or the first implementation of the second aspect of the embodiments of the present application, in a second implementation of the second aspect of the embodiments of the present application, the target uplink controllable gain module includes an output transmit band-pass filter, a receive prefilter, a receive postfilter, a power detection module, a controllable attenuator, a low noise amplifier, a base-station-side port, and an antenna-side port.

The antenna-side port is connected to a first end of the output transmit band-pass filter. The antenna-side port is further connected to a first end of the receive prefilter. A second end of the output transmit band-pass filter is connected to the base-station-side port. A second end of the receive prefilter is connected to an input end of the low noise amplifier by using a first RF switch. An output end of the low noise amplifier is connected to a first end of the controllable attenuator by using a second RF switch. A second end of the controllable attenuator is connected to a first end of the receive postfilter. A second end of the receive postfilter is connected to the base-station-side port.

The receive prefilter is configured to separate an uplink signal coupled from an antenna. The low noise amplifier is configured to amplify the uplink signal. The controllable attenuator is configured to control a gain of an amplified uplink signal. The receive postfilter is configured to filter an uplink signal obtained through gain control. The receive postfilter is configured to combine a downlink signal and an uplink signal at the base-station-side port. The power detection module is configured to detect a downlink power.

With reference to the passive intermodulation suppression system according to any one of the second aspect of the embodiments of the present application to the second implementation of the second aspect of the embodiments of the present application, in a third implementation of the second aspect of the embodiments of the present application, the target uplink controllable gain module is integrated into a tower-mounted amplifier TMA, a combiner, a splitter, or the antenna.

It can be learned that a specific manner of disposing the target uplink controllable gain module is not limited in this embodiment, provided that the target uplink controllable gain module described in this embodiment can perform the passive intermodulation suppression method described in the foregoing embodiment.

Specifically, the passive intermodulation suppression system described in this embodiment may be applied to a multi-frequency system. It can be learned that, when being applied to the multi-frequency system, the passive intermodulation suppression system described in this embodiment can eliminate PIM generated by signals at various frequency bands, without mounting a remote radio unit RRU on a tower and/or adding a feeder.

A third aspect of the embodiments of the present application provides a passive intermodulation suppression system, including a base station and an antenna. At least one uplink controllable gain module is disposed between the base station and the antenna. The antenna is connected to a target uplink controllable gain module. The target uplink controllable gain module is any one of the at least one uplink controllable gain module. The target uplink controllable gain module is further connected to the base station. A passive intermodulation suppression control module is disposed between the base station and the target uplink controllable gain module.

Specifically, the target uplink controllable gain module obtains a first power Pt of an uplink signal sent by the antenna. The target uplink controllable gain module sends the first power Pt to the passive intermodulation suppression control module. The passive intermodulation suppression control module obtains a second power Pb of a signal that is output from an output port of the base station. The passive intermodulation suppression control module configures a target attenuation of the base station. The passive intermodulation suppression control module initiates a PIM suppression function. The passive intermodulation suppression control module determines whether the base station is currently in a downlink no-load state, and if yes, the passive intermodulation suppression control module detects whether a preset time period elapses. The passive intermodulation suppression control module obtains a first received total wideband power RTWP of an uplink of the base station. The passive intermodulation suppression control module loads target load onto a downlink of the base station.

More specifically, the passive intermodulation suppression control module obtains a second RTWP of the uplink of the base station. If the passive intermodulation suppression control module detects that an RTWP degrades, the passive intermodulation suppression control module generates first instruction information. The passive intermodulation suppression control module sends the first instruction information to the target uplink controllable gain module.

The target uplink controllable gain module increases, according to the first instruction information, an initial gain value $G_O$ by step measured in target preset amounts.

The passive intermodulation suppression control module controls a gain of an uplink receive channel of the base station to attenuate by step measured in the target preset amounts, to keep a gain of the base station constant.

The passive intermodulation suppression control module determines whether an absolute value of a difference between the first RTWP and the second RTWP is less than or equal to a preset value, and if yes, the passive intermodulation suppression control module generates second instruction information. The passive intermodulation suppression control module sends the second instruction information to the target uplink controllable gain module. The target uplink controllable gain module no longer adjusts a gain value. The passive intermodulation suppression control module obtains a current gain value $G_T$ of the target uplink controllable gain module. The passive intermodulation suppression control module determines whether the current gain value $G_T$ is equal to a preset maximum gain value, and if yes, the passive intermodulation suppression control module generates third instruction information. The passive intermodulation suppression control module sends the third instruction information to the target uplink controllable gain module. The target uplink controllable gain module no longer adjusts the current gain value $G_T$. The passive intermodulation suppression control module displays an optimized value of an RTWP. The passive intermodulation suppression control module generates fourth instruction information. The passive intermodulation suppression control module sends the fourth instruction information to the target uplink controllable gain module. The target uplink controllable gain module determines, according to the fourth instruction information, not to adjust the initial gain value $G_O$.

The embodiments of the present application provide the passive intermodulation suppression method and the passive intermodulation suppression system. According to the method described in the embodiments, in the process of adjusting the gain of the target uplink controllable gain module, the base station can maintain the target attenuation constant, reduce the PIM requirement of the passive intermodulation suppression system, and improve the sensitivity of uplink reception of the base station. In addition, according to the method described in the embodiments, a plurality of signals at a same frequency band or different frequency bands can share a feeder, and a remote radio unit RRU does not need to be mounted on a tower. It can be learned that, according to the method described in the embodiments, no high costs of tower reinforcement or feeder addition are caused. In addition, the method described in the embodiments can be applicable to frequency bands of various signals, to avoid a case in which a frequency band auctioned by an operator is unusable on some tower stations.

DETAILED DESCRIPTION OF ILLUSTRATIVE EMBODIMENTS

Figure 1:
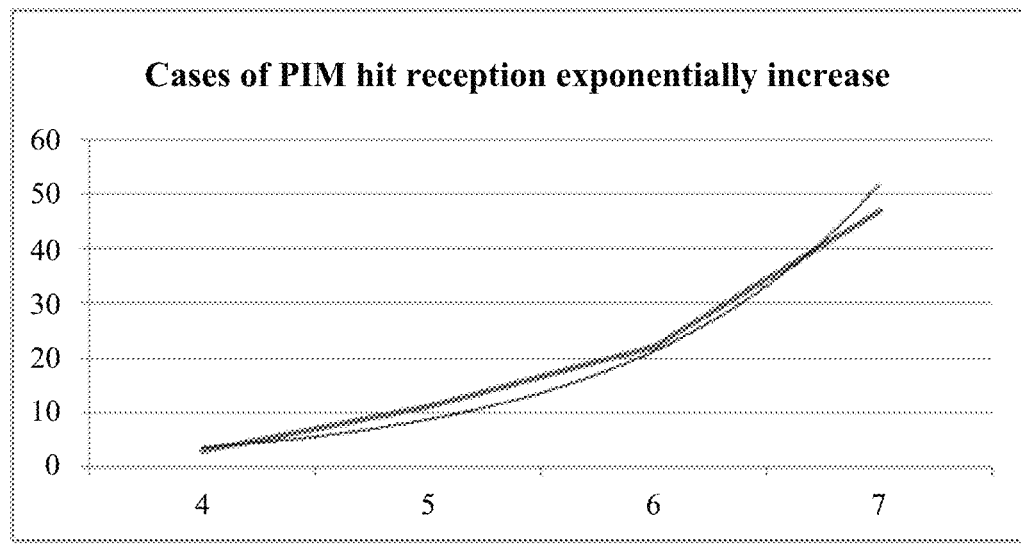
FIG. 1 is a schematic diagram of PIM hit in the prior art.
Figure 2:
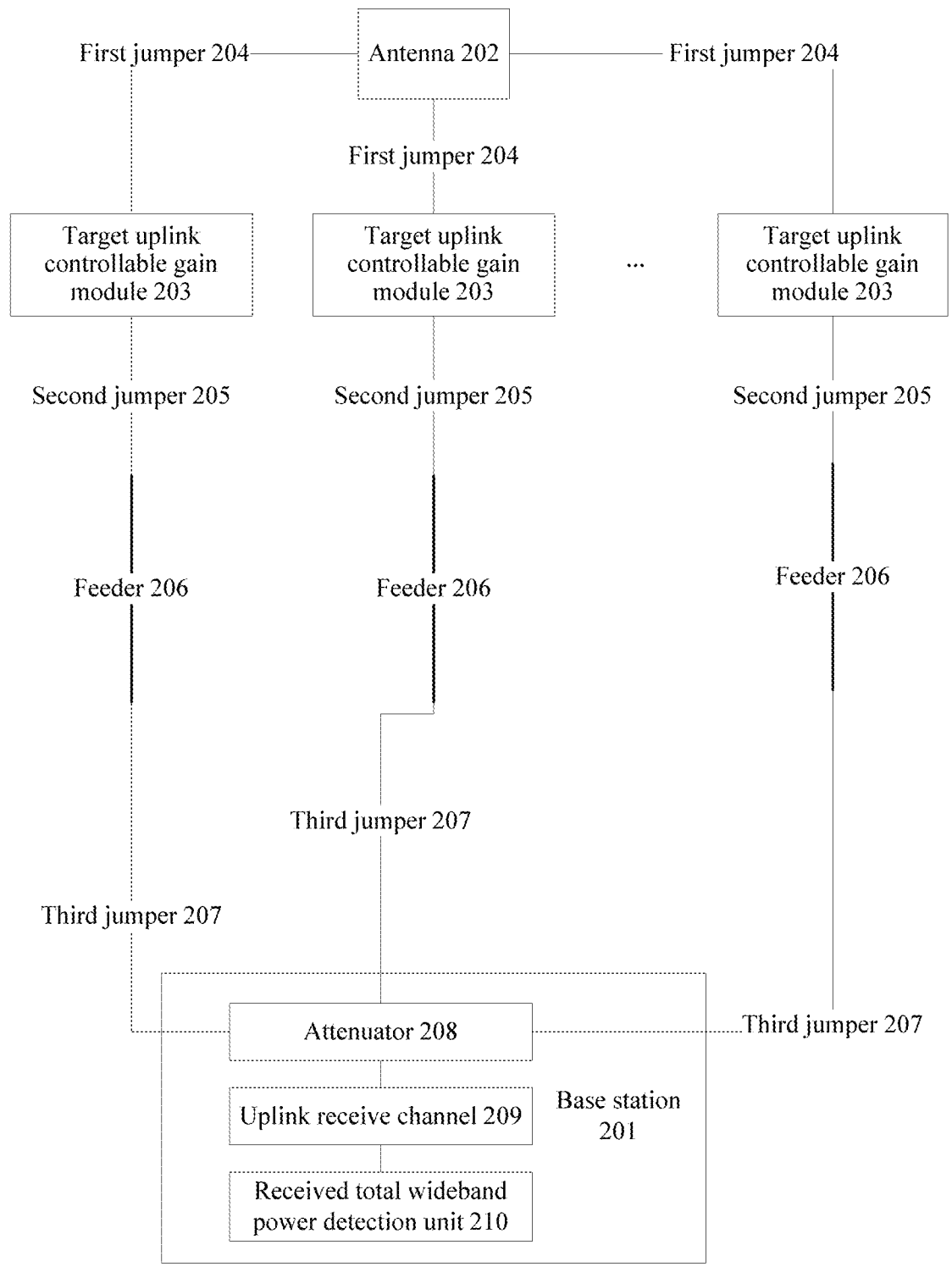
FIG. 2 is a schematic structural diagram of an embodiment of a passive intermodulation suppression system according to the present application.

For better understanding of a passive intermodulation suppression method provided in the embodiments of the present application, the following details, with reference to FIG. 2, a specific structure of a passive intermodulation suppression system provided in an embodiment of the present application.

The passive intermodulation suppression system described in this embodiment includes: a base station 201 and an antenna 202. At least one uplink controllable gain module 203 is disposed between the base station 201 and the antenna 202. A specific quantity of uplink controllable gain modules 203 is not limited in this embodiment.

Specifically, a target uplink controllable gain module is connected to the antenna 202 by using a first jumper 204, and the target uplink controllable gain module is any one of the at least one uplink controllable gain module 203.

The target uplink controllable gain module 203 is connected to a feeder 206 by using a second jumper 205, and the base station 201 is connected to the feeder 206 by using a third jumper 207.

In this embodiment, the target controllable gain module 203 is configured to send, to the base station 201, an uplink signal coupled from a port of the antenna 202.

More specifically, the target controllable gain module 203 may send the uplink signal to the base station 201 according to a communication protocol AISG. It should be noted that the communication protocol used for sending the uplink signal to the base station by the target controllable gain module 203 is not limited in this embodiment.

Specifically, the base station 201 includes an attenuator 208, an uplink receive channel 209, and a received total wideband power (RTWP) detection unit 210 that are connected in sequence.

The received total wideband power detection unit 210 is responsible for measuring an RTWP.

Figure 3A:
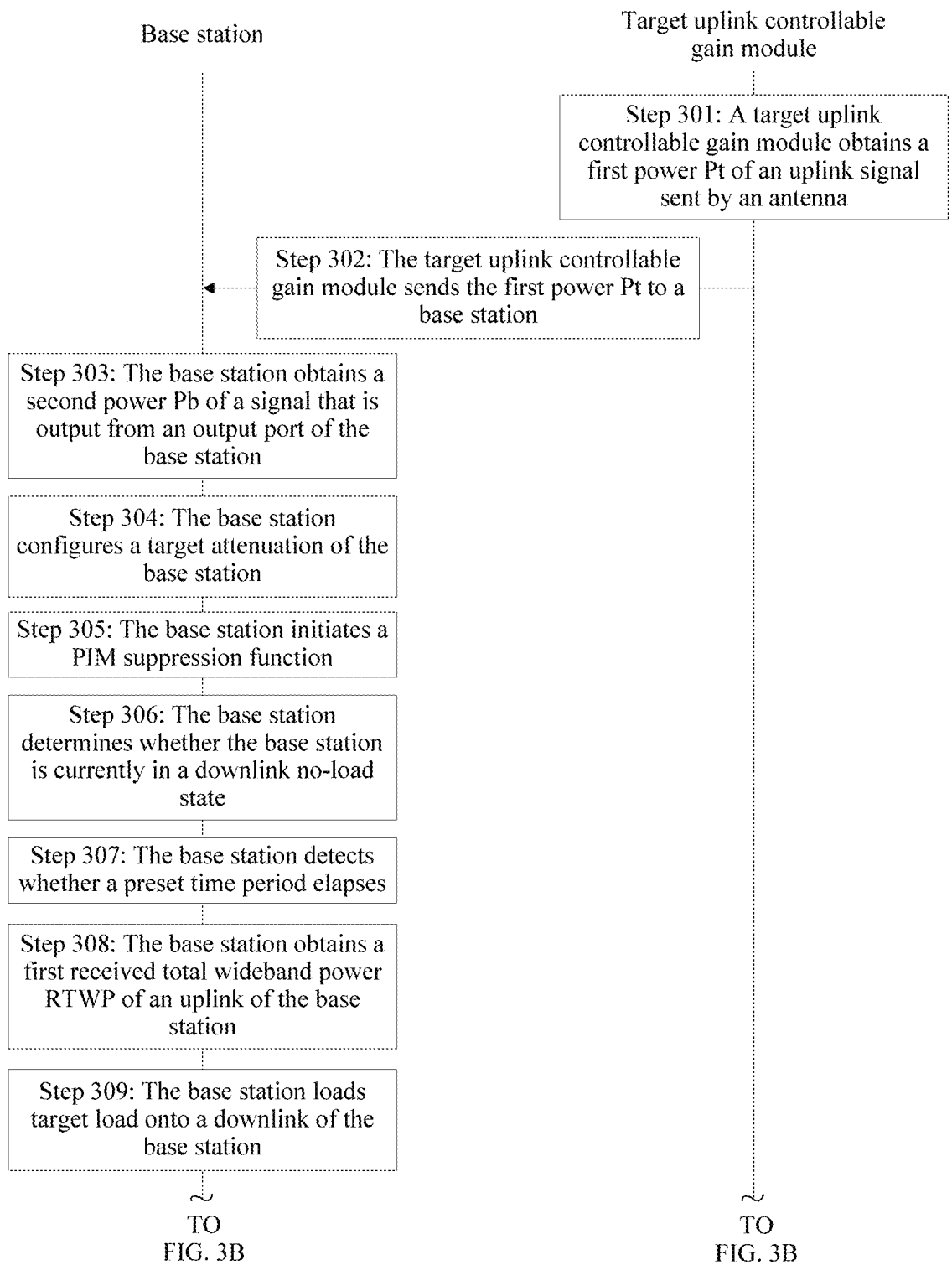
FIG. 3A to FIG. 3C are a flowchart of steps of an embodiment of a passive intermodulation suppression method according to the present application.
Figure 3B:
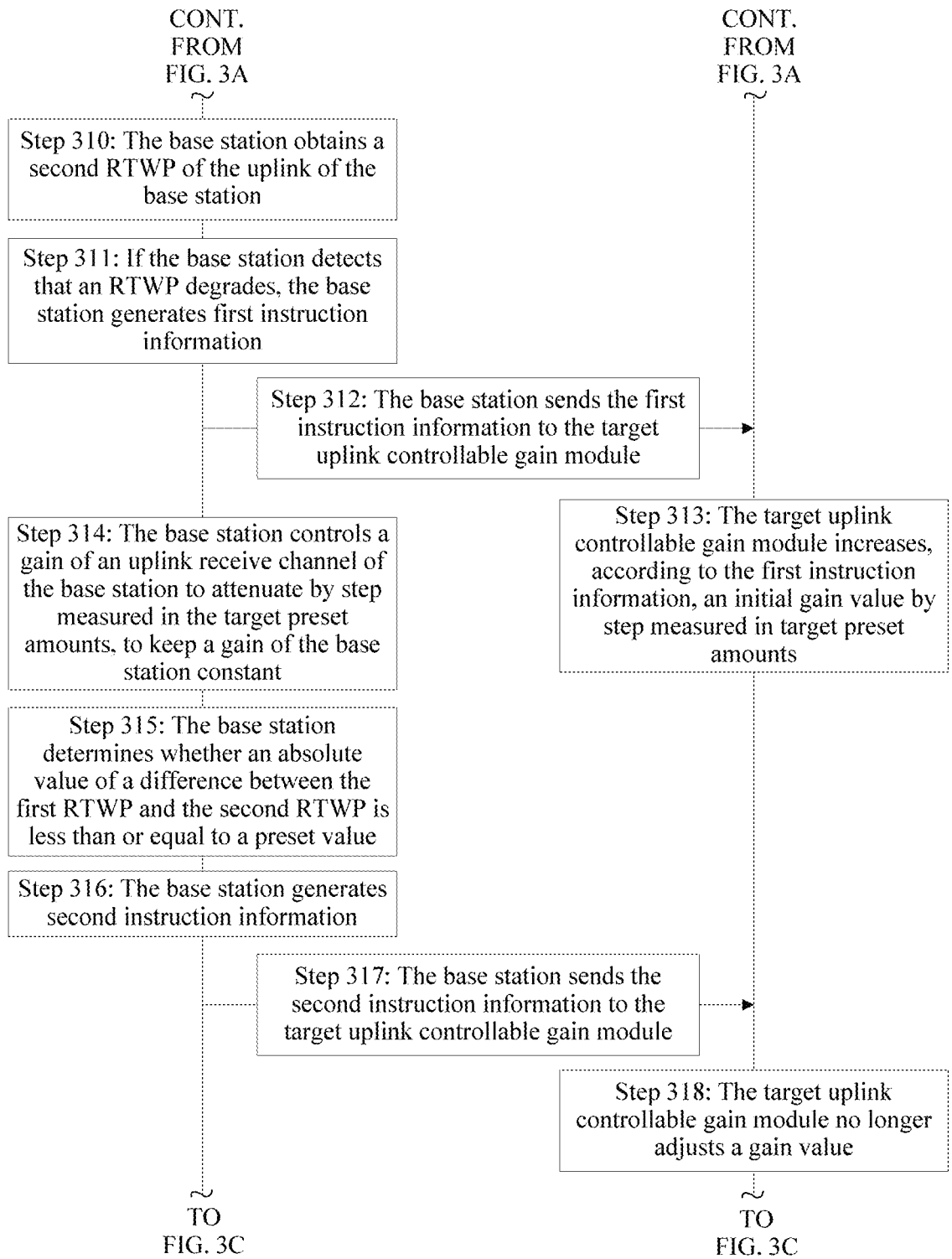
Figure 3C:
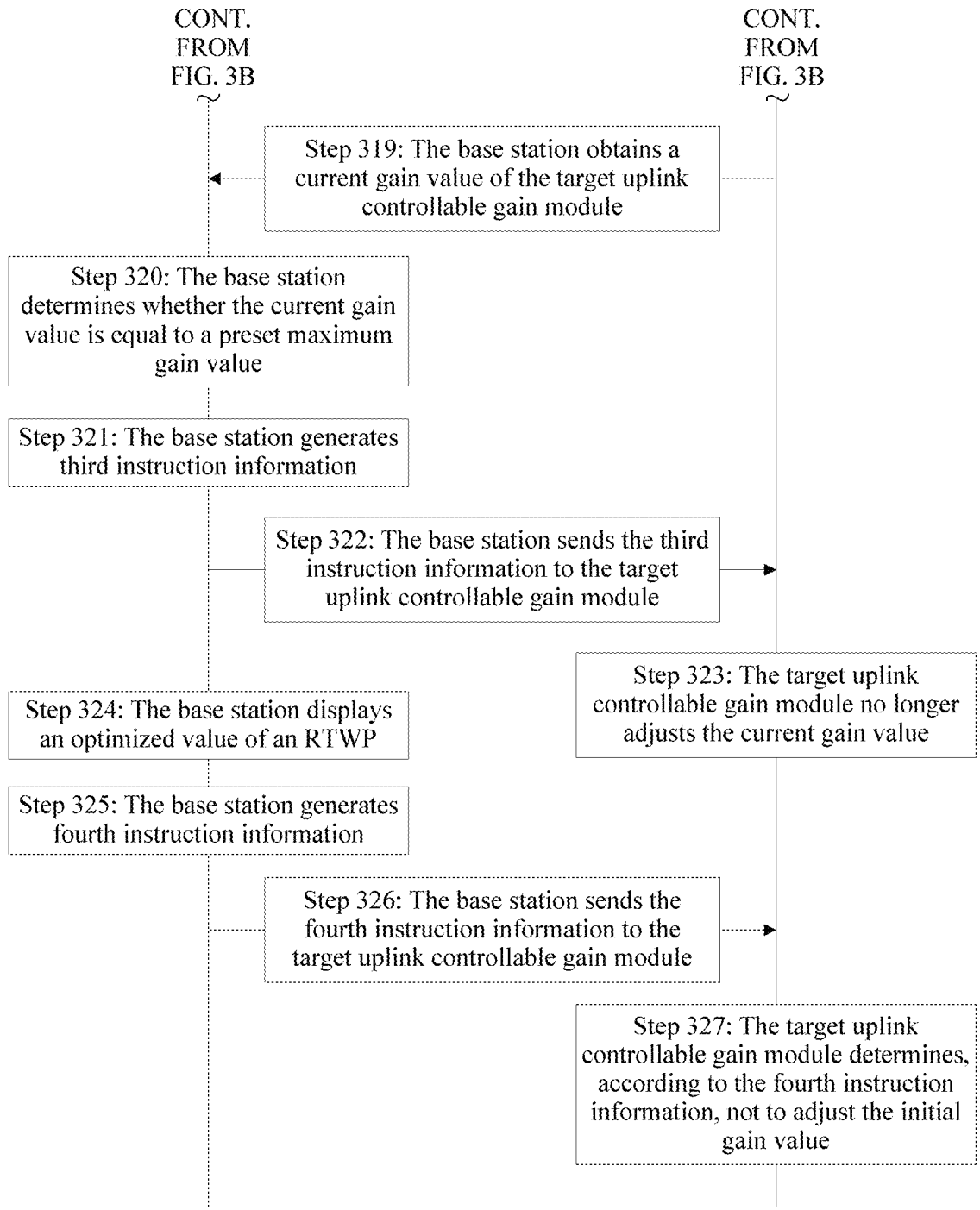

Based on the passive intermodulation suppression system shown in FIG. 2, the following details, with reference to FIG. 3A to FIG. 3C, a specific procedure of a passive intermodulation suppression method provided in an embodiment.

Step 301: A target uplink controllable gain module obtains a first power Pt of an uplink signal sent by an antenna.

For specific descriptions of the target uplink controllable gain module in this embodiment, refer to the embodiment shown in FIG. 2. Details are not described in this embodiment again.

Step 302: The target uplink controllable gain module sends the first power Pt to a base station.

Optionally, the target uplink controllable gain module described in this embodiment may send the first power Pt to the base station according to a communication protocol AISG.

Descriptions of the communication protocol AISG in this embodiment are an optional example, and impose no limitation. For example, the target uplink controllable gain module described in this embodiment may send the first power Pt to the base station according to a customized protocol.

Step 303: The base station obtains a second power Pb of a signal that is output from an output port of the base station.

Step 304: The base station configures a target attenuation of the base station.

The target attenuation $IL = G_0 - (Pb - Pt)$, where $G_0$ is an initial gain value of the target uplink controllable gain module.

Step 305: The base station initiates a PIM suppression function.

In this embodiment, after the base station configures the target attenuation, the base station may initiate the PIM suppression function. The following details a specific process of performing the PIM suppression function by the base station.

Step 306: The base station determines whether the base station is currently in a downlink no-load state, and if yes, performs step 308, or if no, performs step 307.

In this embodiment, after the base station initiates the PIM suppression function, the base station may determine whether the base station is currently in the no-load state, and if yes, performs step 308, or if no, performs step 307.

Step 307: The base station detects whether a preset time period elapses, and if yes, returns to step 306.

In this embodiment, the base station may preset the preset time period, and a length of the preset time period is not limited in this embodiment.

The base station may be configured with a timer. The base station determines, as a timing start moment by using the timer, a moment when the base station determines that the base station currently is not in the no-load state. The base station determines whether a difference between a current moment and the timing start moment is equal to the preset time period, and if yes, it indicates that the base station detects that the preset time period elapses. When the preset time period elapses, the base station may return to step 306.

Optionally, the base station described in this embodiment may count a target quantity of times of continuously performing step 307. If the base station detects that the target quantity of times is greater than a target threshold prestored by the base station, the base station may generate alert information used to prompt a user. The alert information is used to inform the user that the base station has been in the no-load state for a long time, and the user may determine, based on the alert information, that the base station cannot perform the PIM suppression function described in this embodiment.

A value of the target threshold is not limited in this embodiment.

Step 308: The base station obtains a first received total wideband power RTWP of an uplink of the base station.

In this embodiment, when the base station determines whether the base station is currently in the downlink no-load state, the base station may obtain the first received total wideband power RTWP of the uplink of the base station.

Specifically, as shown in FIG. 2, the received total wideband power detection unit 210 of the base station described in this embodiment may be configured to obtain the first RTWP.

It should be noted that descriptions of a specific manner of obtaining the first RTWP by the base station in this embodiment are an optional example, and impose no limitation.

Step 309: The base station loads target load onto a downlink of the base station.

The target load is not specifically limited in this embodiment, provided that the target load is less than or equal to a preset threshold.

Optionally, an example in which the preset threshold is 100% is used for description in this embodiment. In other words, the base station loads 100% load onto the downlink of the base station.

Step 310: The base station obtains a second RTWP of the uplink of the base station.

In this embodiment, after the 100% load is loaded onto the base station, the base station may obtain the second RTWP of the uplink of the base station.

Step 311: If the base station detects that an RTWP degrades, the base station generates first instruction information.

Specifically, if the base station detects that the first RTWP is less than the second RTWP, the base station determines that the current RTWP degrades, and the base station may generate the first instruction information.

The first instruction information in this embodiment is used to instruct the target uplink controllable gain module to increase the initial gain value $G_0$ by step measured in target preset amounts.

Step 312: The base station sends the first instruction information to the target uplink controllable gain module.

Step 313: The target uplink controllable gain module increases, according to the first instruction information, an initial gain value $G_0$ by step measured in target preset amounts.

Step 314: The base station controls a gain of an uplink receive channel of the base station to attenuate by step measured in the target preset amounts, to keep a gain of the base station constant.

In step 313 described in this embodiment, the target uplink controllable gain module increases, by step, the initial gain value $G_0$ stored in the target uplink controllable gain module. To ensure that the target attenuation is constant, the base station attenuates the gain of uplink receive channel of the base station by step measured in the target preset amounts.

It should be noted that in this embodiment, that the target uplink controllable gain module increases the initial gain value $G_0$ by step and the base station attenuates the gain of the uplink receive channel of the base station by step are optional examples and impose no limitation, provided that a gain by which the initial gain value $G_0$ is increased by the target uplink controllable gain module is equal to an attenuation by which the gain of the uplink receive channel of the base station is attenuated. In other words, a gain change of the target uplink controllable gain module is equal to a gain change of the base station.

Step 315: The base station determines whether an absolute value of a difference between the first RTWP and the second RTWP is less than or equal to a preset value, and if yes, performs step 316.

In this embodiment, in a process of performing step 313 and step 315 to adjust the gain, the base station determines whether the absolute value of the difference between the first RTWP and the second RTWP is less than or equal to the preset value. It can be learned that in this embodiment, step 315 is performed in the process of performing step 313 and step 314.

A specific value of the preset value is not limited in this embodiment. Optionally, that the preset value is 0 is used as an example in this embodiment. In other words, the base station determines whether the first RTWP is equal to the second RTWP.

It can be learned that in the process of performing step 313 and step 314 in this embodiment, the target uplink controllable gain module may continuously adjust the initial gain value $G_0$, and the base station may also continuously adjust the gain of the uplink receive channel of the base station until the absolute value of the difference between the first RTWP and the second RTWP is less than or equal to the preset value.

Step 316: The base station generates second instruction information.

In this embodiment, when the base station determines that the absolute value of the difference between the first RTWP and the second RTWP is less than or equal to the preset value, the base station may generate the second instruction information.

The second instruction information is used to instruct the target uplink controllable gain module no longer to adjust a gain value.

Specifically, in a process of performing step 313 in this embodiment, the target uplink controllable gain module increases the initial gain value $G_0$ by step measured in the target preset amounts, until the base station performs step 315 to determine that the absolute value of the difference between the first RTWP and the second RTWP is less than or equal to the preset value. Then, the base station instructs, by using the second instruction information, the target uplink controllable gain module no longer to adjust the gain value. The gain value in this step is a gain value that is obtained by adjusting the initial gain value $G_0$ by step by the target uplink controllable gain module.

Step 317: The base station sends the second instruction information to the target uplink controllable gain module.

Step 318: The target uplink controllable gain module no longer adjusts a gain value.

In this embodiment, after step 313 is performed, step 319 may be further performed in the method described in this embodiment.

Step 319: The base station obtains a current gain value $G_T$ of the target uplink controllable gain module.

In this embodiment, after the target uplink controllable gain module increases the initial gain value $G_0$ by step measured in the target preset amounts, the base station may obtain the current gain value $G_T$.

Step 320: The base station determines whether the current gain value $G_T$ is equal to a preset maximum gain value, and if no, continues to perform step 313, or if yes, performs step 321.

In this embodiment, when the current gain value $G_T$ is less than the preset maximum gain value, the target uplink controllable gain module may continue to increase the initial gain value $G_0$ by step measured in the target preset amounts.

If yes, that is, when determining that the current gain value $G_T$ is equal to the preset maximum gain value, the base station continues to perform step 321.

Step 321: The base station generates third instruction information.

The third instruction information is used to instruct the target uplink controllable gain module no longer to adjust the current gain value $G_T$.

Step 322: The base station sends the third instruction information to the target uplink controllable gain module.

Step 323: The target uplink controllable gain module no longer adjusts the current gain value $G_T$.

It should be noted that a sequence of performing step 319 to step 323 and performing step 315 to step 317 is not limited in this embodiment.

In one case, if the base station determines, in a process of performing step 315 to step 317, that the absolute value of the difference between the first RTWP and the second RTWP is less than or equal to the preset value, regardless of whether the current gain value $G_T$ is equal to the preset maximum gain value in a process of performing step 319 to step 323, the base station performs step 317 to instruct the target uplink controllable gain module no longer to adjust the gain value.

In another case, if the base station determines, in a process of performing step 315 to step 317, that the absolute value of the difference between the first RTWP and the second RTWP is greater than the preset value, if the current gain value $G_T$ is equal to the preset maximum gain value in a process of performing step 319 to step 323, the base station performs step 322 to instruct the target uplink controllable gain module no longer to adjust the current gain value $G_T$.

In another case, if the base station currently determines, in a process of performing step 315 to step 317, that the absolute value of the difference between the first RTWP and the second RTWP is greater than the preset value, if the current gain value $G_T$ is less than the preset maximum gain value in a process of performing step 319 to step 323, the base station continues to perform step 315 to step 317 and step 319 to step 323.

Step 324: The base station displays an optimized value of an RTWP.

Specifically, in this embodiment, when determining that the current gain value $G_T$ is equal to the preset maximum gain value, the base station may perform step 324.

The optimized value of the RTWP in this embodiment is the difference between the first RTWP and the second RTWP.

In this embodiment, after step 310 is performed, step 325 described in this embodiment may be performed.

Step 325: The base station generates fourth instruction information.

Specifically, when the base station determines that the first RTWP is equal to the second RTWP, the base station generates the fourth instruction information. The fourth instruction information is used to instruct the target uplink controllable gain module not to adjust the initial gain value $G_0$.

Step 326: The base station sends the fourth instruction information to the target uplink controllable gain module.

Step 327: The target uplink controllable gain module determines, according to the fourth instruction information, not to adjust the initial gain value $G_0$.

According to the method described in this embodiment, in a process of adjusting a gain of the target uplink controllable gain module, the base station can maintain the target attenuation constant, reduce a PIM requirement of the passive intermodulation suppression system, and improve sensitivity of uplink reception of the base station. In addition, according to the method described in this embodiment, a plurality of signals at a same frequency band or different frequency bands can share a feeder, and a remote radio unit RRU does not need to be mounted on a tower. It can be learned that according to the method described in this embodiment, no high costs of tower reinforcement or feeder addition are caused. In addition, the method described in this embodiment can be applicable to frequency bands of various signals, to avoid a case in which a frequency band auctioned by an operator is unusable on some tower stations.

Figure 4:
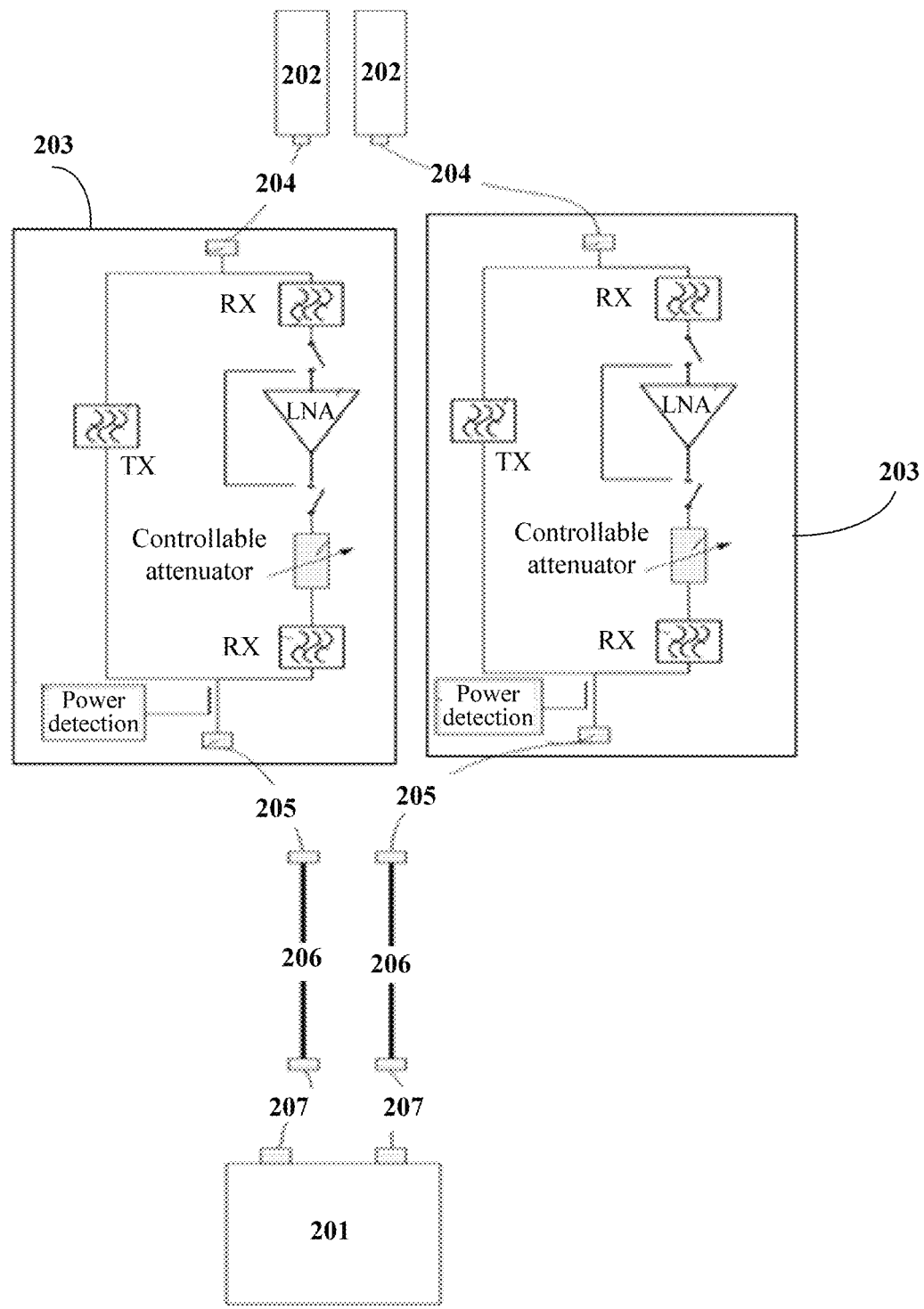
FIG. 4 is a schematic structural diagram of another embodiment of a passive intermodulation suppression system according to the present application.

The following details, with reference to FIG. 4, a specific structure of the passive intermodulation suppression system provided in this embodiment.

For specific descriptions of the base station 201, the antenna 202, the target uplink controllable gain module 203, the first jumper 204, the second jumper 205, the feeder 206, and the third jumper 207, also refer to the embodiment shown in FIG. 2.

As shown in FIG. 4, for example, two target uplink controllable gain modules 203 are disposed between the base station 201 and the antenna 202. In a specific application, there may be one or more target uplink controllable gain modules 203. A specific quantity of target uplink controllable gain modules 203 is not further described in this embodiment.

In a specific application, different target uplink controllable gain modules 203 may perform gain control on signals at a same frequency or different frequencies. Details are not described in this embodiment.

The passive intermodulation suppression system described in this embodiment can implement the passive intermodulation suppression method shown in FIG. 3A to FIG. 3C. For details about a specific process of performing the passive intermodulation suppression method, refer to FIG. 3A to FIG. 3C. Details are not described in this embodiment again.

Figure 5:
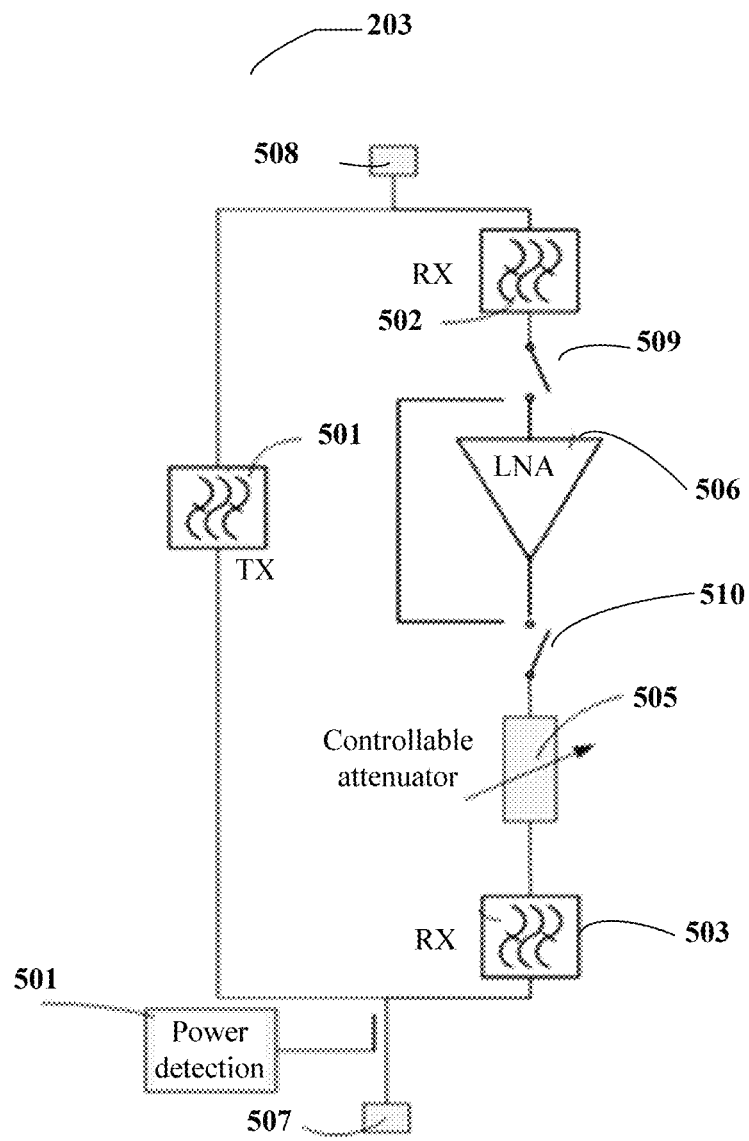
FIG. 5 is a schematic structural diagram of an embodiment of a target uplink controllable gain module according to the present application.

The following details, with reference to FIG. 5, a specific structure of the target uplink controllable gain module 203 provided in this embodiment.

As shown in FIG. 5, the target uplink controllable gain module 203 includes an output transmit band-pass filter 501, a receive prefilter 502, a receive postfilter 503, a power detection module 504, a controllable attenuator 505, a low noise amplifier 506, a base-station-side port 507, and an antenna-side port 508.

Specifically, the antenna-side port 508 is connected to a first end of the output transmit band-pass filter 501, and a second end of the output transmit band-pass filter 501 is connected to the base-station-side port 507.

The antenna-side port 508 is further connected to a first end of the receive prefilter 502. A second end of the receive prefilter 502 is connected to an input end of the low noise amplifier 506 by using a first RF switch 509. An output end of the low noise amplifier 506 is connected to a first end of the controllable attenuator 505 by using a second RF switch 510. A second end of the controllable attenuator 505 is connected to a first end of the receive postfilter 503. A second end of the receive postfilter 503 is connected to the base-station-side port 507.

Specifically, the receive prefilter 502 is configured to separate an uplink signal coupled from an antenna, the low noise amplifier 506 is configured to amplify the uplink signal, the controllable attenuator 505 is configured to control a gain of an amplified uplink signal, the receive postfilter 503 is configured to filter an uplink signal obtained through gain control, the receive postfilter 503 is configured to combine a downlink signal and an uplink signal at the base-station-side port 507, and the power detection module 504 is configured to detect a downlink power.

With reference to FIG. 4 and FIG. 5, a specific signal flowchart of the target uplink controllable gain module 203 described in this embodiment is described as follows.

An uplink signal RX coupled from a port of the antenna 202 goes through the receive prefilter 502 of the target uplink controllable gain module 203, and then is amplified by the low noise amplifier 506. The controllable attenuator 505 performs gain control on an amplified uplink signal, and then the receive postfilter 503 filters an uplink signal obtained through the gain control. After an uplink signal obtained through the filtering is combined in the output transmit band-pass filter 501, a combined signal enters the base station port by using the second jumper 205 and the feeder 206.

A transmit signal of the base station is output through the base station port, goes through the power detection module 504 and the output transmit band-pass filter 501 of the target uplink controllable gain module 203, goes along the first jumper 204, and is radiated to the air through the antenna port.

Optionally, the target uplink controllable gain module 203 described in this embodiment may be integrated into a tower-mounted amplifier TMA, a combiner, a splitter, or the antenna.

It can be learned that a specific manner of disposing the target uplink controllable gain module 203 is not limited in this embodiment, provided that the target uplink controllable gain module 203 described in this embodiment can perform the passive intermodulation suppression method shown in FIG. 3A to FIG. 3C.

Figure 6:
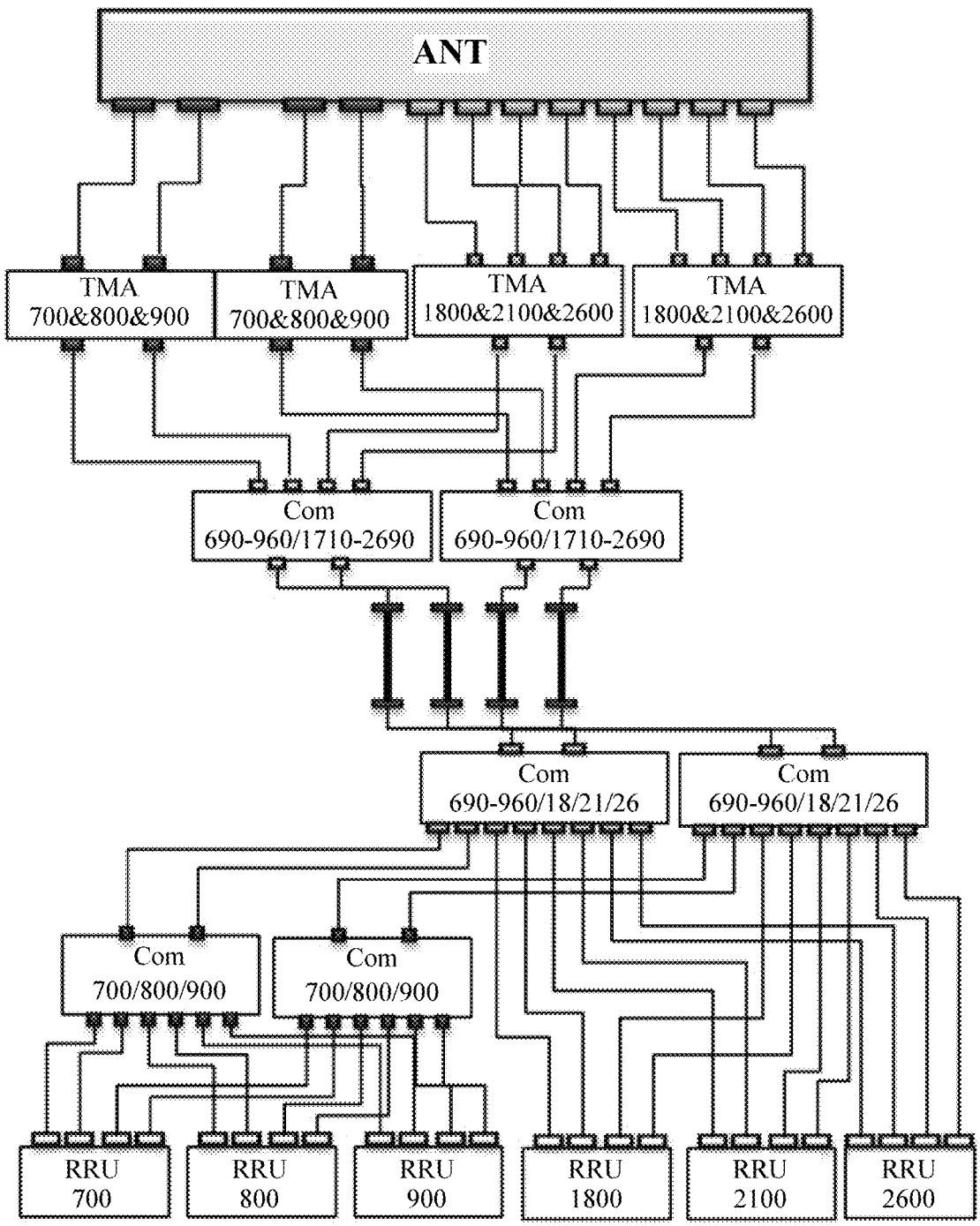
FIG. 6 is a schematic structural diagram of an embodiment of a multi-frequency system according to the present application.

Specifically, the passive intermodulation suppression system described in this embodiment may be applied to a multi-frequency system. For details, refer to FIG. 6, and details are not described herein again. It can be learned that, when being applied to the multi-frequency system, the passive intermodulation suppression system described in this embodiment can eliminate PIM generated by signals at various frequency bands, without mounting a remote radio unit RRU on a tower and/or adding a feeder.

Figure 7:
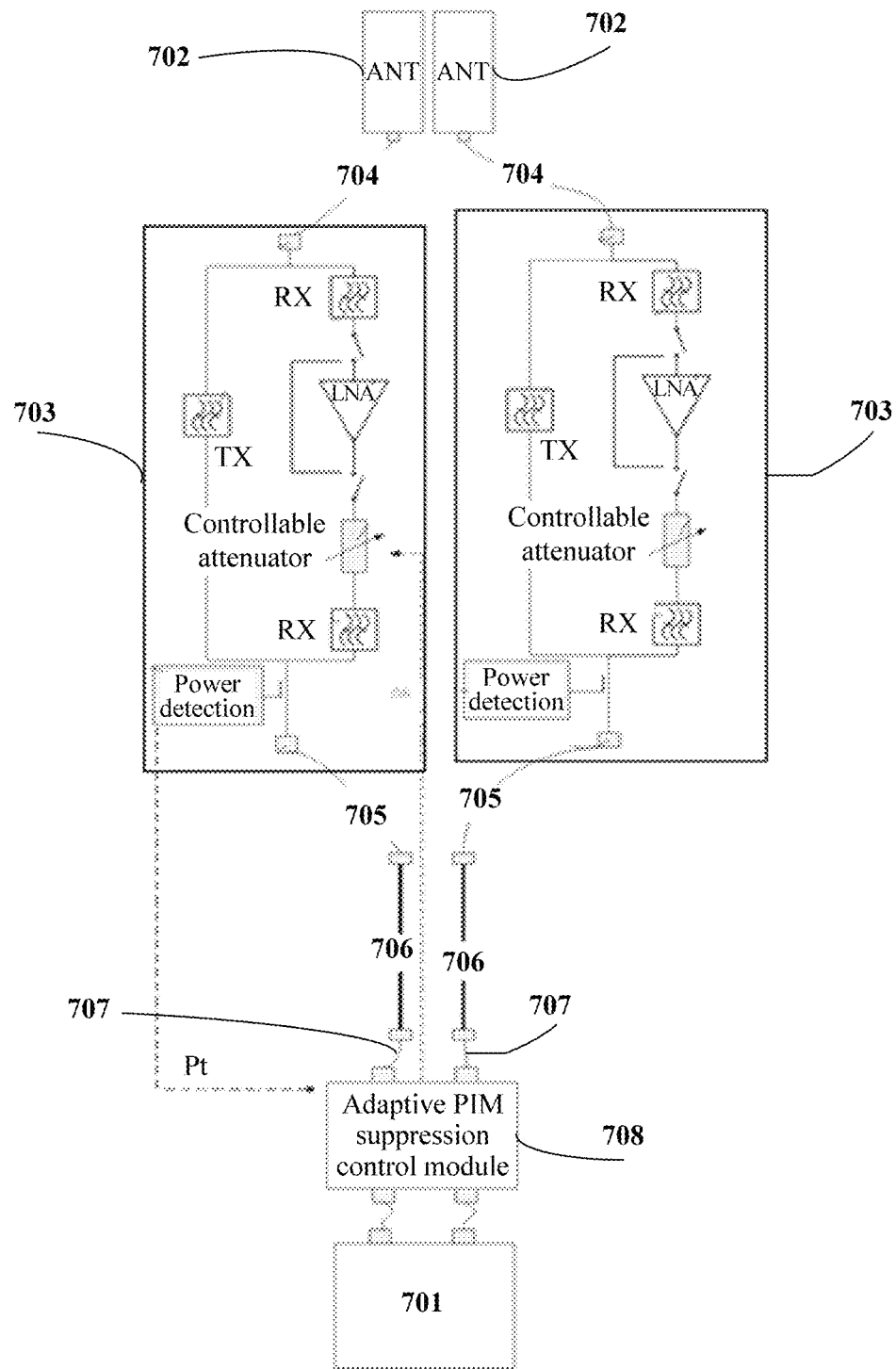
FIG. 7 is a schematic structural diagram of another embodiment of a passive intermodulation suppression system according to the present application.

The following describes, with reference to FIG. 7, a specific structure of another passive intermodulation suppression system provided in an embodiment.

The passive intermodulation suppression system includes the base station 701, the antenna 702, a target uplink controllable gain module 703, a first jumper 704, a second jumper 705, a feeder 706, and a third jumper 707.

For specific descriptions of the base station 701, the antenna 702, the target uplink controllable gain module 703, the first jumper 704, the second jumper 705, the feeder 706, and the third jumper 707 that are described in this embodiment, refer to FIG. 4. Details are not described in this embodiment again.

The passive intermodulation suppression system described in this embodiment further includes a passive intermodulation suppression control module 708, and the passive intermodulation suppression control module 708 is connected and disposed between the base station 701 and the target uplink controllable gain module 703.

Figure 8A:
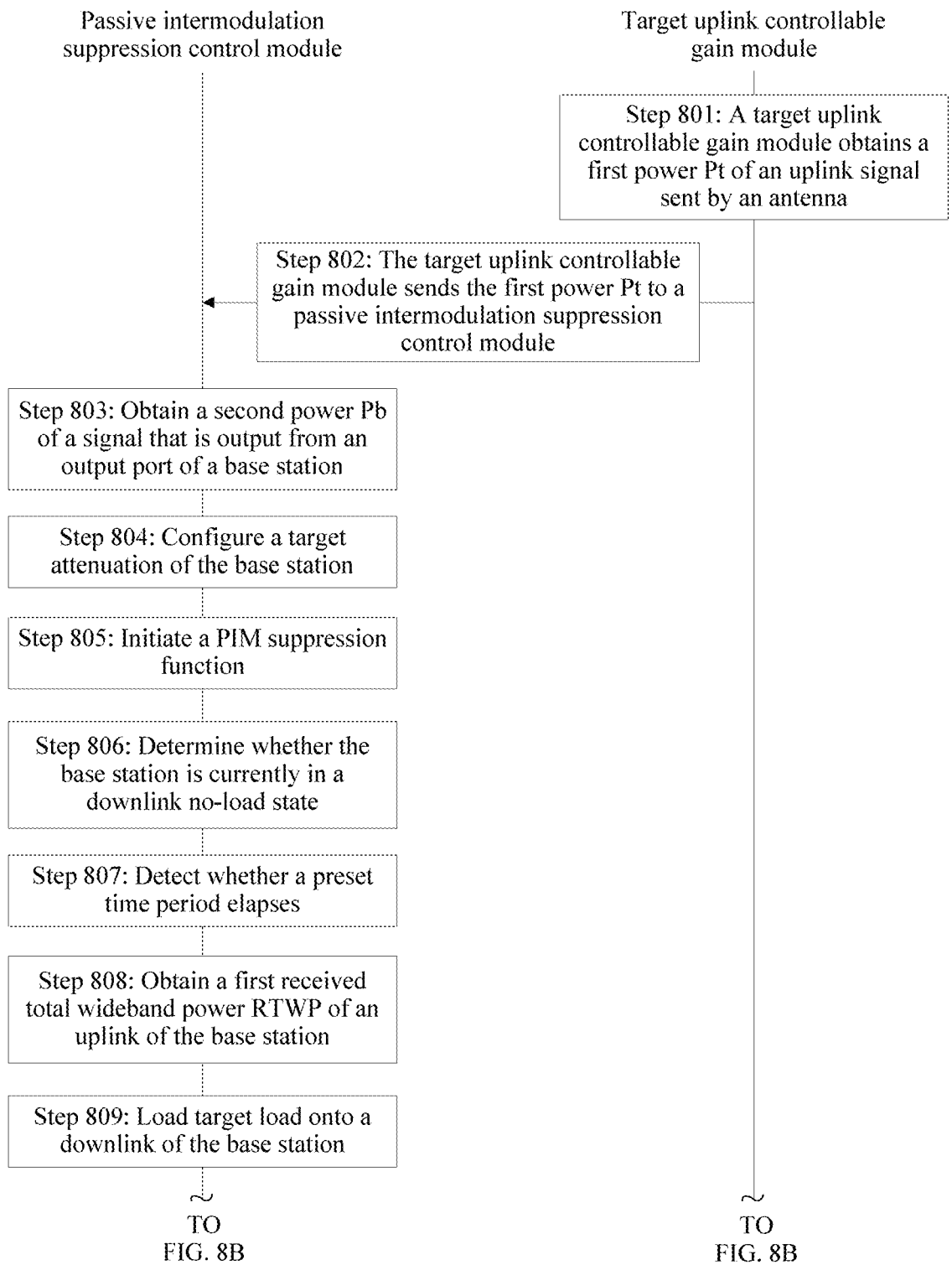
FIG. 8A to FIG. 8C are a flowchart of steps of another embodiment of a passive intermodulation suppression method according to the present application.
Figure 8B:
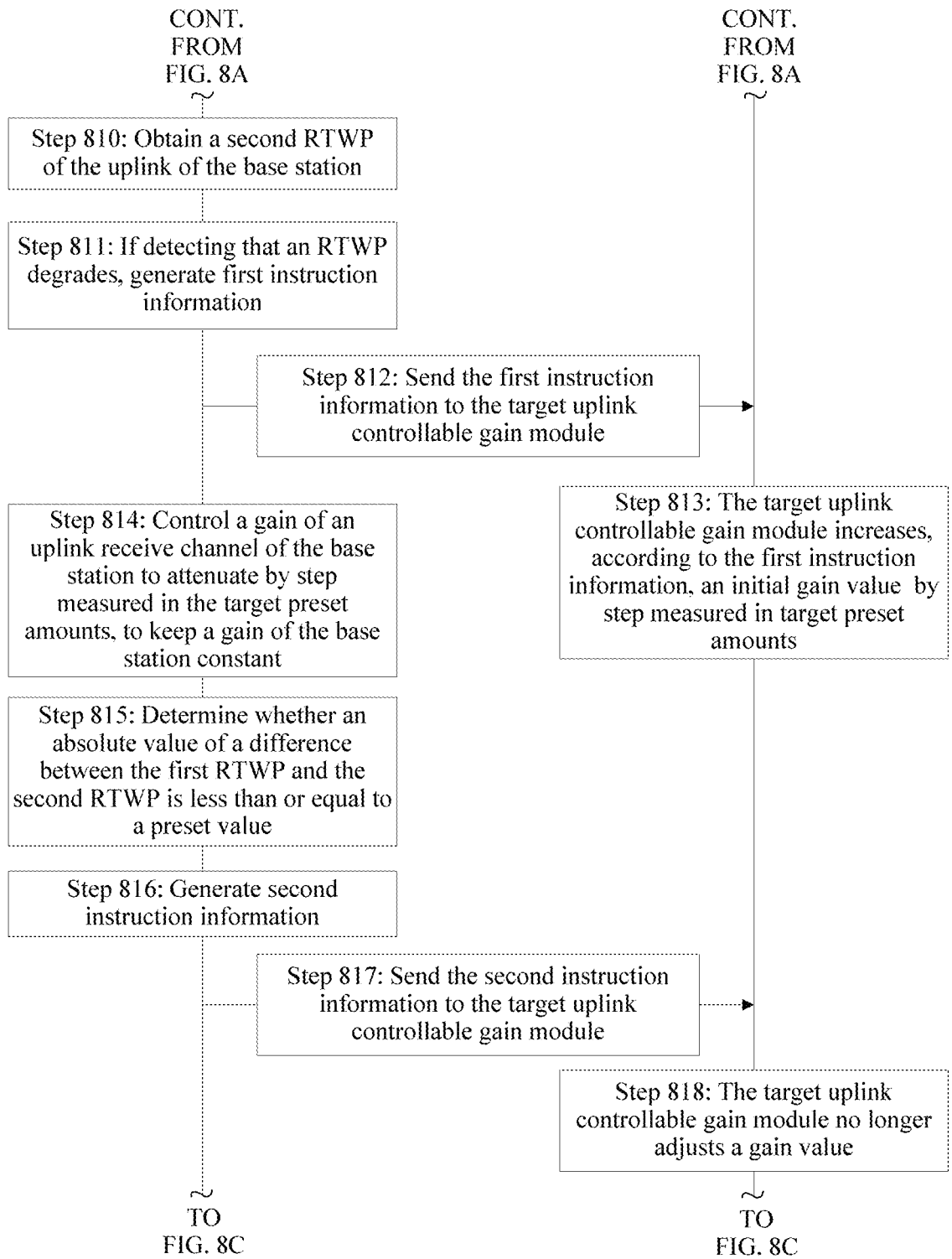
Figure 8C:
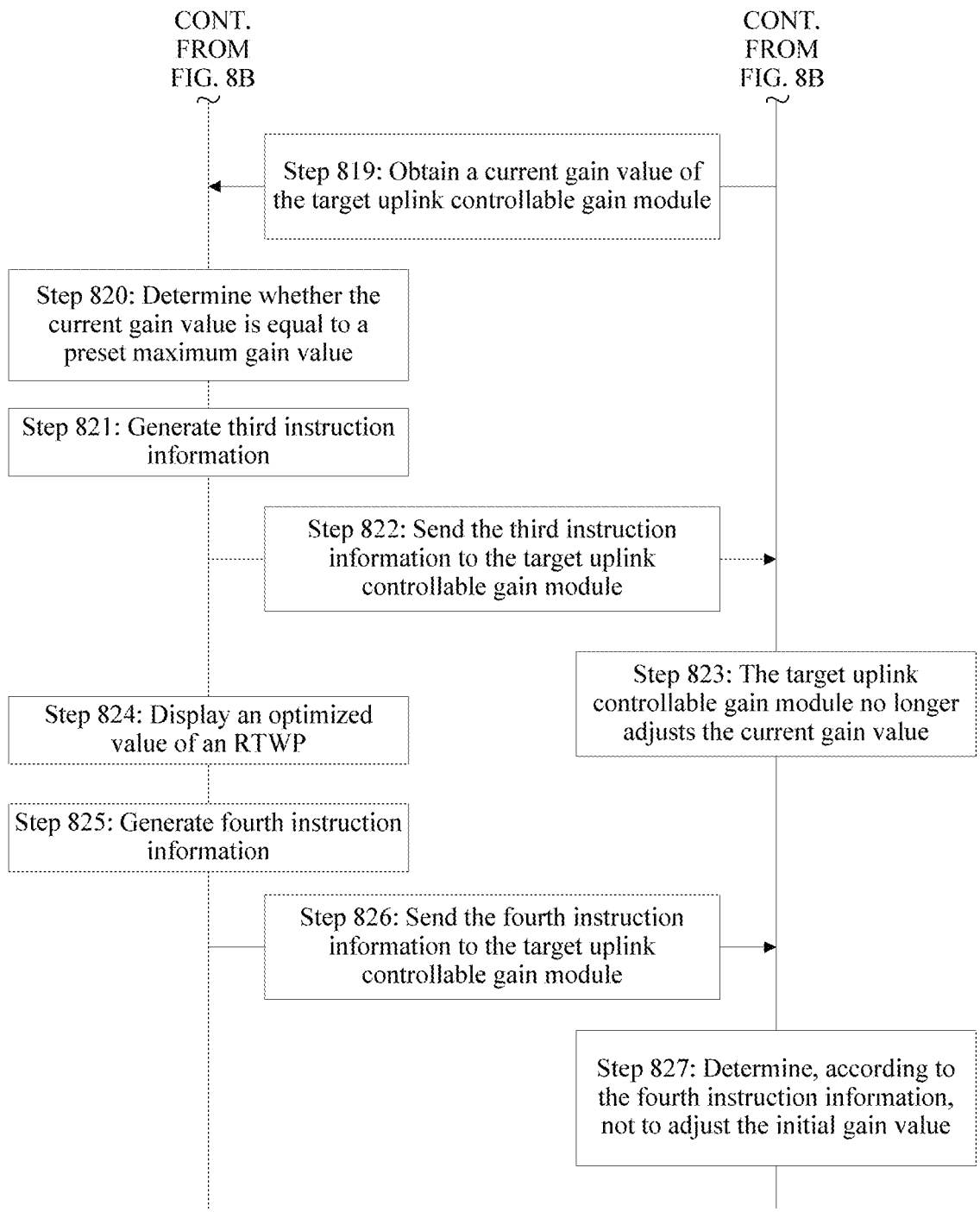

The passive intermodulation suppression control module 708 described in this embodiment can perform a passive intermodulation suppression method. The following describes, with reference to FIG. 8A to FIG. 8C, a specific process of performing the passive intermodulation suppression method by the passive intermodulation suppression control module 708.

Step 801: A target uplink controllable gain module obtains a first power Pt of an uplink signal sent by an antenna.

For details about a specific process of performing step 801 described in this embodiment, refer to step 301 shown in FIG. 3A. Details are not described again.

Step 802: The target uplink controllable gain module sends the first power Pt to a passive intermodulation suppression control module.

Step 803: The passive intermodulation suppression control module obtains a second power Pb of a signal that is output from an output port of a base station.

Step 804: The passive intermodulation suppression control module configures a target attenuation of the base station.

Step 805: The passive intermodulation suppression control module initiates a PIM suppression function.

Step 806: The passive intermodulation suppression control module determines whether the base station is currently in a downlink no-load state, and if yes, performs step 808, or if no, performs step 807.

Step 807: The passive intermodulation suppression control module detects whether a preset time period elapses, and if yes, returns to step 806.

Step 808: The passive intermodulation suppression control module obtains a first received total wideband power RTWP of an uplink of the base station.

Step 809: The passive intermodulation suppression control module loads target load onto a downlink of the base station.

Step 810: The passive intermodulation suppression control module obtains a second RTWP of the uplink of the base station.

Step 811: If the passive intermodulation suppression control module detects that an RTWP degrades, the passive intermodulation suppression control module generates first instruction information.

Step 812: The passive intermodulation suppression control module sends the first instruction information to the target uplink controllable gain module.

Step 813: The target uplink controllable gain module increases, according to the first instruction information, an initial gain value $G_O$ by step measured in target preset amounts.

Step 814: The passive intermodulation suppression control module controls a gain of an uplink receive channel of the base station to attenuate by step measured in the target preset amounts, to keep a gain of the base station constant.

Step 815: The passive intermodulation suppression control module determines whether an absolute value of a difference between the first RTWP and the second RTWP is less than or equal to a preset value, and if yes, performs step 816.

Step 816: The passive intermodulation suppression control module generates second instruction information.

Step 817: The passive intermodulation suppression control module sends the second instruction information to the target uplink controllable gain module.

Step 818: The target uplink controllable gain module no longer adjusts a gain value.

Step 819: The passive intermodulation suppression control module obtains a current gain value $G_T$ of the target uplink controllable gain module.

Step 820: The passive intermodulation suppression control module determines whether the current gain value $G_T$ is equal to a preset maximum gain value, and if no, continues to perform step 813, or if yes, performs step 821.

Step 821: The passive intermodulation suppression control module generates third instruction information.

Step 822: The passive intermodulation suppression control module sends the third instruction information to the target uplink controllable gain module.

Step 823: The target uplink controllable gain module no longer adjusts the current gain value $G_T$.

Step 824: The passive intermodulation suppression control module displays an optimized value of an RTWP.

Step 825: The passive intermodulation suppression control module generates fourth instruction information.

Step 826: The passive intermodulation suppression control module sends the fourth instruction information to the target uplink controllable gain module.

Step 827: The target uplink controllable gain module determines, according to the fourth instruction information, not to adjust the initial gain value $G_O$.

For a specific process of performing step 801 to step 827 described in this embodiment, refer to the passive intermodulation suppression method that is performed by the base station and that is shown in FIG. 3A to FIG. 3C. For a specific process of the passive intermodulation suppression method performed by the passive intermodulation suppression control module in this embodiment, refer to FIG. 3A to FIG. 3C. Details are not described again.

According to the method described in this embodiment, in a process of adjusting a gain of the target uplink controllable gain module, the passive intermodulation suppression control module can maintain the target attenuation constant, reduce a PIM requirement of the passive intermodulation suppression system, and improve sensitivity of uplink reception of the base station. In addition, according to the method described in this embodiment, a plurality of signals at a same frequency band or different frequency bands can share a feeder, and a remote radio unit RRU does not need to be mounted on a tower. It can be learned that according to the method described in this embodiment, no high costs of tower reinforcement or feeder addition are caused. In addition, the method described in this embodiment can be applicable to frequency bands of various signals, to avoid a case in which a frequency band auctioned by an operator is unusable on some tower stations.

It may be clearly understood by persons skilled in the art that, for ease and brevity of description, for detailed working processes of the foregoing system, apparatus, and unit, reference may be made to corresponding processes in the foregoing method embodiments, and details are not described herein again.

The foregoing embodiments are merely intended to describe the technical solutions of the present application, but not to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A passive intermodulation suppression method, comprising:
    obtaining, by using a target uplink controllable gain module, a first power Pt of an uplink signal sent by an antenna, wherein at least one uplink controllable gain module is disposed between a base station and the antenna, and the target uplink controllable gain module is any one of the at least one uplink controllable gain module;
    obtaining a second power Pb of a signal that is output from an output port of the base station;
    configuring a target attenuation of the base station, wherein the target attenuation IL=$G_0$−(Pb−Pt), wherein $G_0$ is an initial gain value of the target uplink controllable gain module; and
    adjusting the initial gain value based on the target attenuation to keep a gain of the base station constant.

2. The method according to claim 1, wherein after the configuring a target attenuation of the base station, the method further comprises:
    if the base station is currently in a downlink no-load state, obtaining a first received total wideband power (RTWP) of an uplink of the base station; and
    obtaining a second RTWP of the uplink of the base station, wherein the second RTWP is an RTWP that is used when target load is loaded onto a downlink of the base station, and the target load is less than or equal to a preset threshold.

3. The method according to claim 2, wherein the adjusting the initial gain value based on the target attenuation comprises:
    if the first RTWP is less than the second RTWP, generating first instruction information, wherein the first instruction information is used to instruct the target uplink controllable gain module to increase the initial gain value $G_0$ by step measured in target preset amounts; and
    sending the first instruction information to the target uplink controllable gain module.

4. The method according to claim 3, wherein after the sending the first instruction information to the target uplink controllable gain module, the method further comprises:
    controlling the base station to attenuate the gain of the base station by step measured in the target preset amounts, to keep the gain of the base station constant.

5. The method according to claim 3, wherein after the adjusting the initial gain value based on the target attenuation, the method further comprises:
    determining whether an absolute value of a difference between the first RTWP and the second RTWP is less than or equal to a preset value;
    if determining that the absolute value of the difference between the first RTWP and the second RTWP is less than or equal to the preset value, generating second instruction information, wherein the second instruction information is used to instruct the target uplink controllable gain module no longer to adjust a gain value; and
    sending the second instruction information to the target uplink controllable gain module.

6. The method according to any claim 3, wherein after the adjusting the initial gain value based on the target attenuation, the method further comprises:
    obtaining a current gain value $G_T$ of the target uplink controllable gain module;
    determining whether the current gain value $G_T$ is equal to a preset maximum gain value;
    if determining that the current gain value $G_T$ is equal to the preset maximum gain value, generating third instruction information, wherein the third instruction information is used to instruct the target uplink controllable gain module no longer to adjust the current gain value $G_T$; and
    sending the third instruction information to the target uplink controllable gain module.

7. The method according to claim 2, wherein the adjusting the initial gain value based on the target attenuation comprises:
    if the first RTWP is equal to the second RTWP, generating fourth instruction information, wherein the fourth instruction information is used to instruct the target uplink controllable gain module not to adjust the initial gain value $G_0$; and
    sending the fourth instruction information to the target uplink controllable gain module.

8. A passive intermodulation suppression system, comprising a base station and an antenna, wherein at least one uplink controllable gain module is disposed between the base station and the antenna, the antenna is connected to a target uplink controllable gain module, the target uplink controllable gain module is any one of the at least one uplink controllable gain module, and the target uplink controllable gain module is further connected to the base station; and
    the base station is configured to:
        obtaining, by using a target uplink controllable gain module, a first power Pt of an uplink signal sent by an antenna, wherein at least one uplink controllable gain module is disposed between a base station and the antenna, and the target uplink controllable gain module is any one of the at least one uplink controllable gain module;
        obtaining a second power Pb of a signal that is output from an output port of the base station;
        configuring a target attenuation of the base station, wherein the target attenuation IL=$G_0$−(Pb−Pt), wherein $G_0$ is an initial gain value of the target uplink controllable gain module; and
        adjusting the initial gain value based on the target attenuation to keep a gain of the base station constant.

9. The passive intermodulation suppression system according to claim 8, wherein the system further comprises a first jumper, a second jumper, a third jumper, and a feeder; and the target uplink controllable gain module is connected to the antenna by using the first jumper, the target uplink controllable gain module is connected to the feeder by using the second jumper, and the base station is connected to the feeder by using the third jumper.

10. The passive intermodulation suppression system according to claim 8, wherein the target uplink controllable gain module comprises an output transmit band-pass filter, a receive prefilter, a receive postfilter, a power detection module, a controllable attenuator, a low noise amplifier, a base-station-side port, and an antenna-side port;

the antenna-side port is connected to a first end of the output transmit band-pass filter, the antenna-side port is further connected to a first end of the receive prefilter, a second end of the output transmit band-pass filter is connected to the base-station-side port, a second end of the receive prefilter is connected to an input end of the low noise amplifier by using a first RF switch, an output end of the low noise amplifier is connected to a first end of the controllable attenuator by using a second RF switch, a second end of the controllable attenuator is connected to a first end of the receive postfilter, and a second end of the receive postfilter is connected to the base-station-side port; and the receive prefilter is configured to separate an uplink signal coupled from an antenna, the low noise amplifier is configured to amplify the uplink signal, the controllable attenuator is configured to control a gain of an amplified uplink signal, the receive postfilter is configured to filter an uplink signal obtained through gain control, the receive postfilter is configured to combine a downlink signal and an uplink signal at the base-station-side port, and the power detection module is configured to detect a downlink power.

11. The passive intermodulation suppression system according to claim 8, wherein the target uplink controllable gain module is integrated into a tower-mounted amplifier TMA, a combiner, a splitter, or the antenna.

12. A passive intermodulation suppression system, comprising a base station and an antenna, wherein at least one uplink controllable gain module is disposed between the base station and the antenna, the antenna is connected to a target uplink controllable gain module, the target uplink controllable gain module is any one of the at least one uplink controllable gain module, the target uplink controllable gain module is further connected to the base station, and a passive intermodulation suppression control module is disposed between the base station and the target uplink controllable gain module; and the passive intermodulation suppression control module is configured to: obtaining, by using a target uplink controllable gain module, a first power Pt of an uplink signal sent by an antenna, wherein at least one uplink controllable gain module is disposed between a base station and the antenna, and the target uplink controllable gain module is any one of the at least one uplink controllable gain module;

obtaining a second power Pb of a signal that is output from an output port of the base station;

configuring a target attenuation of the base station, wherein the target attenuation $IL=G_0-(Pb-Pt)$, wherein $G_0$ is an initial gain value of the target uplink controllable gain module; and adjusting the initial gain value based on the target attenuation to keep a gain of the base station constant.

13. The passive intermodulation suppression system according to claim 12, wherein the passive intermodulation suppression control module is further configured to:

if the base station is currently in a downlink no-load state, obtaining a first received total wideband power (RTWP) of an uplink of the base station; and obtaining a second RTWP of the uplink of the base station, wherein the second RTWP is an RTWP that is used when target load is loaded onto a downlink of the base station, and the target load is less than or equal to a preset threshold.

* * * * *